(12) United States Patent
Hase

(10) Patent No.: US 8,175,453 B2
(45) Date of Patent: May 8, 2012

(54) IMAGING APPARATUS

(75) Inventor: Hiroyuki Hase, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/973,119

(22) Filed: Dec. 20, 2010

(65) Prior Publication Data

US 2011/0150461 A1  Jun. 23, 2011

(30) Foreign Application Priority Data

Dec. 22, 2009  (JP) ................. 2009-291276

(51) Int. Cl.
*G03B 17/00* (2006.01)
(52) U.S. Cl. ...................................................... 396/535
(58) Field of Classification Search .................. 396/535
See application file for complete search history.

(56) References Cited

U.S. PATENT DOCUMENTS

| 7,457,056 B2 | 11/2008 | Kobayashi | |
| 7,978,220 B2* | 7/2011 | Urakami et al. | 348/207.99 |
| 2004/0212720 A1 | 10/2004 | Kobayashi | |
| 2008/0079846 A1* | 4/2008 | Ikari | 348/373 |
| 2011/0150461 A1* | 6/2011 | Hase | 396/535 |

FOREIGN PATENT DOCUMENTS

JP   2004-325555 A   11/2004

* cited by examiner

*Primary Examiner* — W. B. Perkey
(74) *Attorney, Agent, or Firm* — Carter, DeLuca, Farrell & Schmidt LLP

(57) ABSTRACT

An imaging apparatus includes an imaging sensor configured to convert a subject image passing through a photographing optical system into an electrical signal, a holding member configured to hold the imaging sensor, and a dust-proofing member configured to surround the circumference of a light reception surface of the imaging sensor. An urging portion is integrally formed with the dust-proofing member urging the holding member in a direction that the holding member is apart from the photographing optical system.

7 Claims, 6 Drawing Sheets

IMAGING APPARATUS

BACKGROUND OF THE INVENTION

1. Field of the Invention

The present invention relates to an imaging apparatus in which optical adjustment of an imaging sensor can be performed.

2. Description of the Related Art

Conventionally, an imaging apparatus is well-known in which optical adjustment of an imaging sensor can be performed. For example, an imaging apparatus discussed in Japanese Patent Application Laid-Open No. 2004-325555 includes a compression spring disposed between a charge-coupled device (CCD) ground plate and a CCD holding plate to which an imaging sensor is fixed, and three adjustment screws that move the CCD holding plate in the optical axis direction with respect to the CCD ground plate.

In the optical adjustment of the imaging sensor, the screwed amount of the three adjustment screws are changed with each other, thereby performing fine adjustment of the imaging sensor in the optical axis direction.

However, a conventional imaging apparatus has a problem that dedicated parts such as a compression spring are required to perform the optical adjustment of the imaging sensor, the number of parts is thus increased, and the imaging apparatus is not easily assembled. Further, the conventional imaging apparatus has a problem that the degree of freedom for arranging the compression spring is small, and the optical adjustment cannot be executed depending on the arrangement of the compression spring.

SUMMARY OF THE INVENTION

The present invention is directed to an imaging apparatus in which positional adjustment and inclination adjustment of an imaging sensor in an optical axis direction can be performed without necessity of dedicated parts.

According to an aspect of the present invention, an imaging apparatus includes an imaging sensor configured to convert a subject image passing through a photographing optical system into an electrical signal, a holding member configured to hold the imaging sensor, and a dust-proofing member configured to surround the circumference of a light reception surface of the imaging sensor. An urging portion is integrally formed to the dust-proofing member to urge the holding member in a direction apart from the photographing optical system.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1:
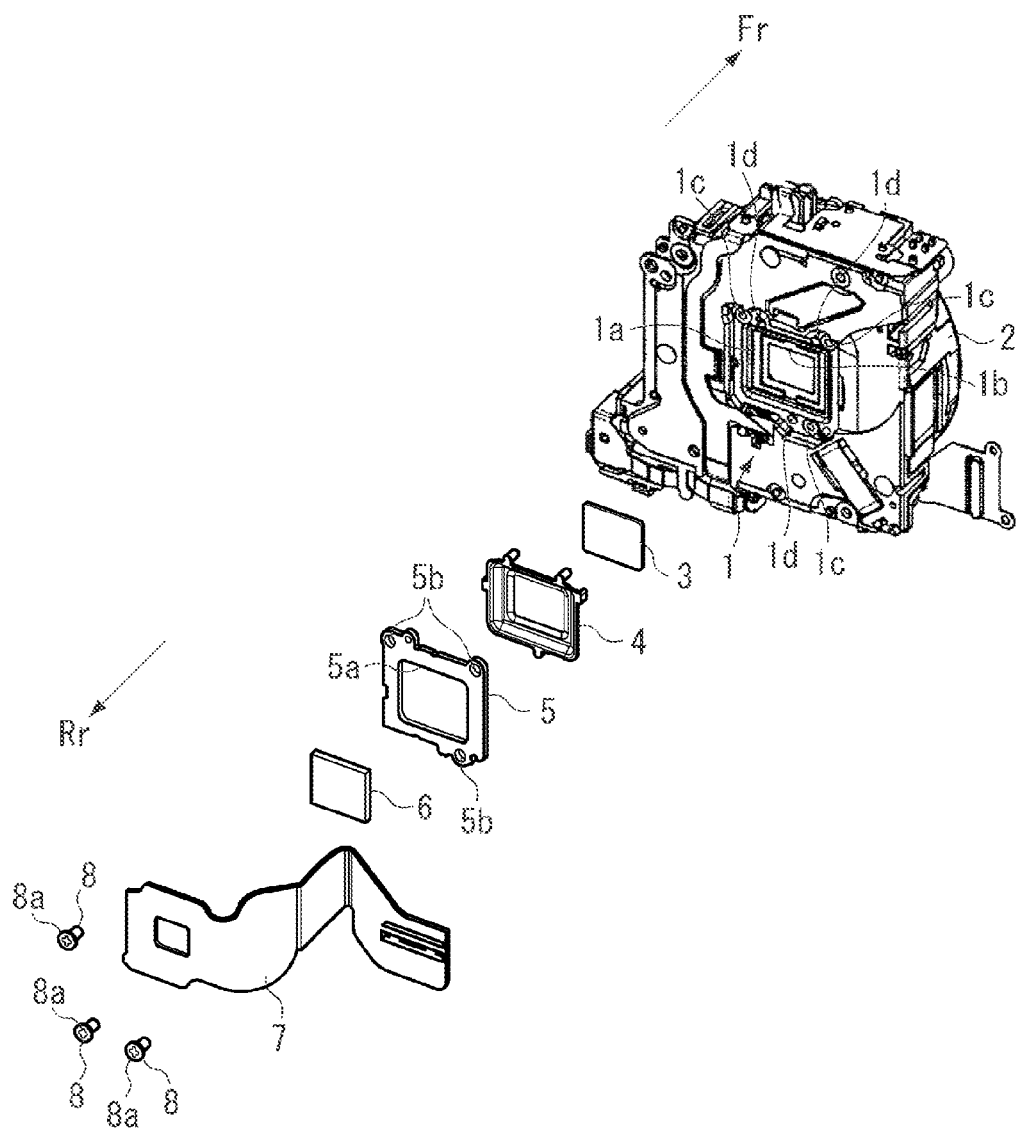
FIG. 1 is an exploded perspective view illustrating an internal configuration of an imaging apparatus according to an exemplary embodiment of the present invention.

Various exemplary embodiments, features, and aspects of the invention will be described in detail below with reference to the drawings.

According to an exemplary embodiment, a digital camera is described as an imaging apparatus. In the drawings, if necessary, the front direction of the photographing direction of the digital camera is indicated as Fr, and the opposite direction thereof is indicated as Rr.

FIG. 1 is a perspective view illustrating part of components included in the digital camera, mainly components around an imaging sensor.

Referring to FIG. 1, the digital camera includes a fixing ground plate 1, a lens barrel 2, an optical filter 3, a dust-proofing rubber 4, a holding plate 5, an imaging sensor 6, a flexible substrate 7, and adjustment screws 8.

The fixing ground plate 1 supports the lens barrel 2 and the imaging sensor 6. The fixing ground plate 1 has a recessed containing chamber 1a that contains the imaging sensor 6 at the opposite position of the fixing side of the lens barrel 2. The containing chamber 1a has an opening 1b that determines the amount of incident light of subject beams and cuts off harmful beams.

Around the containing chamber 1a, a plurality of female screw portions 1c into which the adjustment screws 8 (adjustment members) are screwed are formed. A closed-end hole 1d is formed in the optical axis direction, adjacent to the female screw portions 1c.

The optical filter 3 cuts off high frequency noise components from light irradiated to a light reception surface of the imaging sensor 6. The optical filter 3 is flat and is supported by the dust-proofing rubber 4 at the rear position of the opening 1b in the containing chamber 1a of the fixing ground plate 1.

The dust-proofing rubber 4 (dust-proofing member) has elasticity, and prevents invasion of foreign matters such as dirt between the optical filter 3 and the imaging sensor 6. The dust-proofing rubber 4 is supported by the holding plate 5 at the rear position of the optical filter 3 in the containing chamber 1a of the fixing ground plate 1.

The holding plate 5 (holding member) holds the imaging sensor 6 and the flexible substrate 7. The holding plate 5 is flat and has an opening 5a that contains a part of the entire circumference of a package of the imaging sensor 6. The holding plate 5 has through-holes 5b into which adjustment screws 8 are inserted, and is supported to the fixing ground plate 1 by the adjustment screws 8.

The imaging sensor 6 converts a subject image passing through a photographing optical system into an electrical signal. The imaging sensor 6 is soldered to the flexible substrate 7.

The flexible substrate 7 transmits the converted electrical signal to another processing circuit (not illustrated). The holding plate 5, the imaging sensor 6, and the flexible substrate 7 are assembled in advance in an integrated state.

Figure 2:
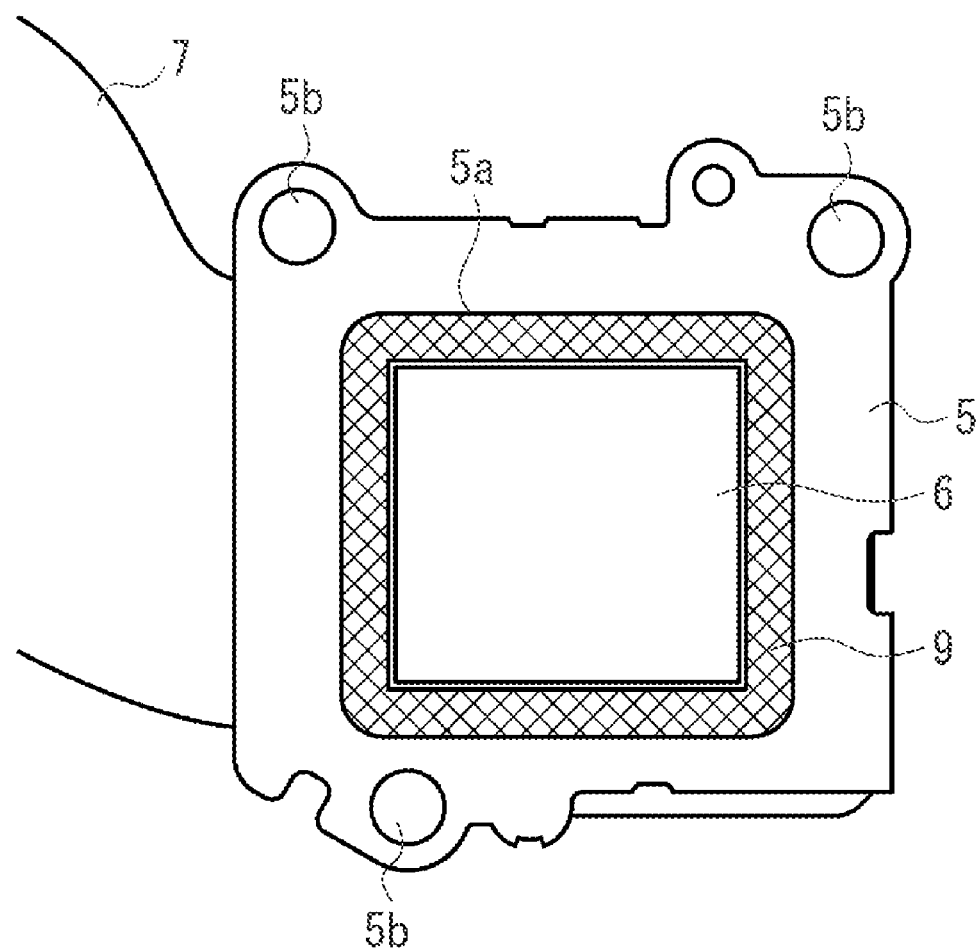
FIG. 2 is a front view illustrating a bonding state between an imaging sensor and a holding plate according to the exemplary embodiment.

FIG. 2 is a front view illustrating a state of assembling the imaging sensor 6 and the flexible substrate 7 to the holding plate 5. As illustrated in FIG. 2, a part of the entire circumference of the package of the imaging sensor 6 is inserted into the opening 5a of the holding plate 5, an adhesive 9 is coated between the entire circumference of the package of the imaging sensor 6 and the opening 5a of the holding plate 5, thereby fixing the imaging sensor 6 to the holding plate 5.

Figure 3A:
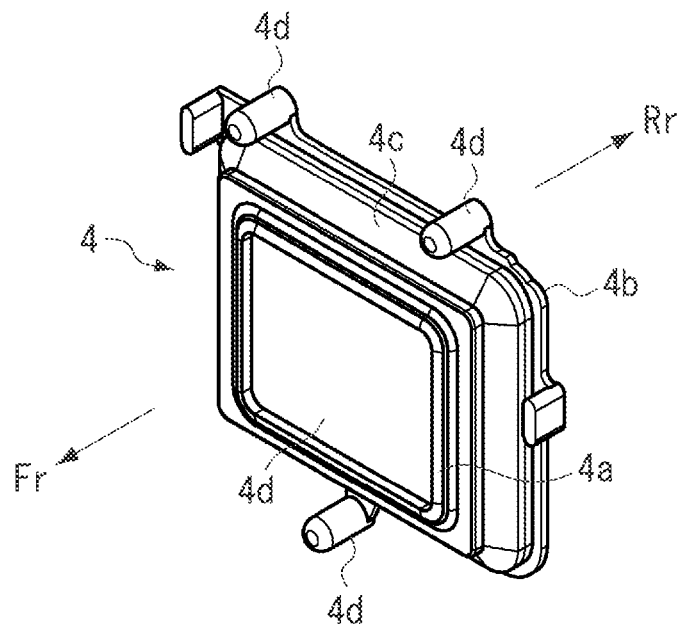
FIGS. 3A and 3B are perspective views illustrating a dust-proofing rubber according to the exemplary embodiment.
Figure 3B:
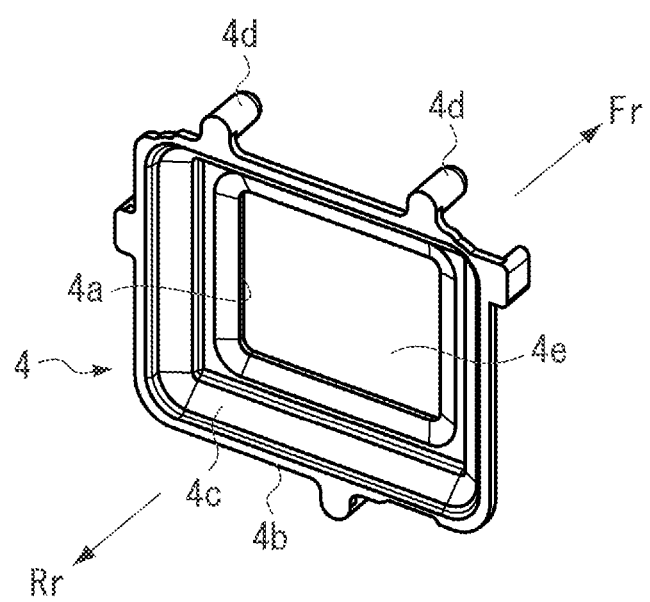

According to the present exemplary embodiment, the positional adjustment in the optical axis direction and inclination adjustment of the imaging sensor 6 uses elastic force of the dust-proofing rubber 4. A description is given of a specific shape of the dust-proofing rubber 4 with reference to FIGS. 3A and 3B. FIG. 3A is a perspective view illustrating the dust-proofing rubber 4 viewed from the diagonal front direction, and FIG. 3B is a perspective view illustrating the dust-proofing rubber 4 viewed from the diagonal rear direction.

In the front view, the dust-proofing rubber 4 is smaller than the outer shape of the holding plate 5, with a rectangular shape, larger than the opening 5a of the holding plate 5, and has an opening 4e smaller than the outer shape of the optical filter 3 in the center thereof. The front surface at the inner circumference fringe of the opening 4e has a pressing portion 4a that comes into contact with a rear surface of an outer circumference fringe of the optical filter 3.

The pressing portion 4a presses the optical filter 3 to the fixing ground plate 1. The rear surface of the outer circumference fringe of the dust-proofing rubber 4 comes into contact with the holding plate 5.

The dust-proofing rubber 4 is formed diagonally to be projected in the front direction from the abutment portion 4b toward the pressing portion 4a. A connecting portion between the abutment portion 4b and the pressing portion 4a forms a dust-proofing portion 4c having elastic force. In a state in which the dust-proofing rubber 4 is attached to the fixing ground plate 1, the dust-proofing portion 4c surrounds the circumference of the light reception surface of the imaging sensor 6, thereby preventing the adhesion of dusts to the light reception surface of the imaging sensor 6.

When force is applied to the dust-proofing rubber 4 to reduce the distance between the abutment portion 4b and the pressing portion 4a in the optical axis direction, in contrast, elastic force is generated in the dust-proofing portion 4c to increase the distance between the abutment portion 4b and the pressing portion 4a.

More specifically, when moving the holding plate 5 in the front side of the optical axis direction, which will be described later, the elastic force of the dust-proofing portion 4c urges the optical filter 3 in the front direction via the pressing portion 4a, and the holding plate 5 is urged in the optical axis direction via the abutment portion 4b.

With the elastic force of the dust-proofing portion 4c, there is always no space between the optical filter 3 and the dust-proofing rubber 4 and between the holding plate 5 and the dust-proofing rubber 4. The optical filter 3 is sealed from the imaging sensor 6, thereby preventing the invasion of foreign matters such as dirt.

Further, a projected urging portion 4d (projected portion) extended in the front direction of the optical axis direction is integrally formed to the outer fringe of the abutment portion 4b of the dust-proofing rubber 4. The dust-proofing rubber 4 according to the present exemplary embodiment has, in total, three urging portions 4d of two from the top end of the abutment portion 4b and one from the bottom end thereof.

The urging portion 4d has a cylindrical shape along the front and rear direction (the optical axis direction), and is extensible in the front and rear direction. Each urging portion 4d has an outer diameter capable of inserting the urging portion 4d into the corresponding closed-end hole 1d of the fixing ground plate 1.

As described above, the closed-end hole 1d and the female screw portion 1c of the fixing ground plate 1 are adjacently formed. Therefore, in a state in which the dust-proofing rubber 4 is attached to the fixing ground plate 1, the urging portions 4d are arranged at the position adjacent to the three adjustment screws 8, respectively.

The urging portions 4d have a function for finely adjusting the position of the imaging sensor 6 in the optical axis direction and the inclination of the imaging sensor 6 by changing the screwed amounts of the three adjustment screws 8.

Next, a case of attaching the optical filter 3, the dust-proofing rubber 4, the holding plate 5, the imaging sensor 6, and the flexible substrate 7 to the fixing ground plate 1 will be described with reference to FIG. 4.

Figure 4:
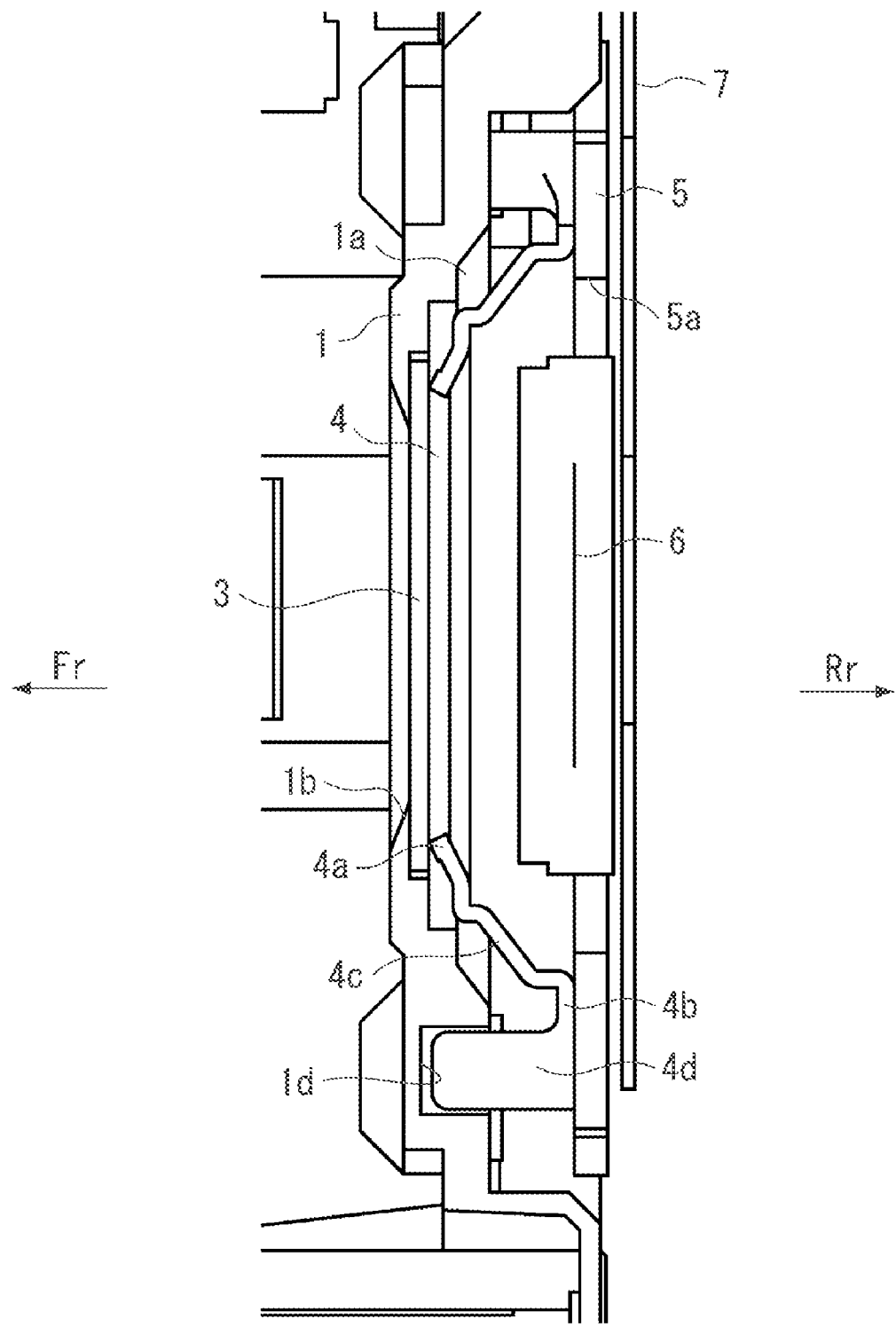
FIG. 4 is a cross-sectional view illustrating a state of the imaging sensor before fixing thereof with screws according to the exemplary embodiment.

FIG. 4 is a cross-sectional view illustrating a state before attaching the components to the fixing ground plate 1. FIG. 4 is a longitudinal cross-sectional view, cut by a plane passing through the center of the urging portion 4d projected from the bottom end of the dust-proofing rubber 4.

As illustrated in FIG. 4, the optical filter 3, the dust-proofing rubber 4, and the holding plate 5 that holds the imaging sensor 6 and the flexible substrate 7 are sequentially assembled into the containing chamber 1a of the fixing ground plate 1. At this time, the urging portion 4d of the dust-proofing rubber 4 is inserted in the corresponding closed-end hole 1c of the fixing ground plate 1. Thereafter, the adjustment screws 8 are inserted into the through-holes 5b of the holding plate 5, and are screwed to the corresponding female screw portions 1c.

Figure 5:
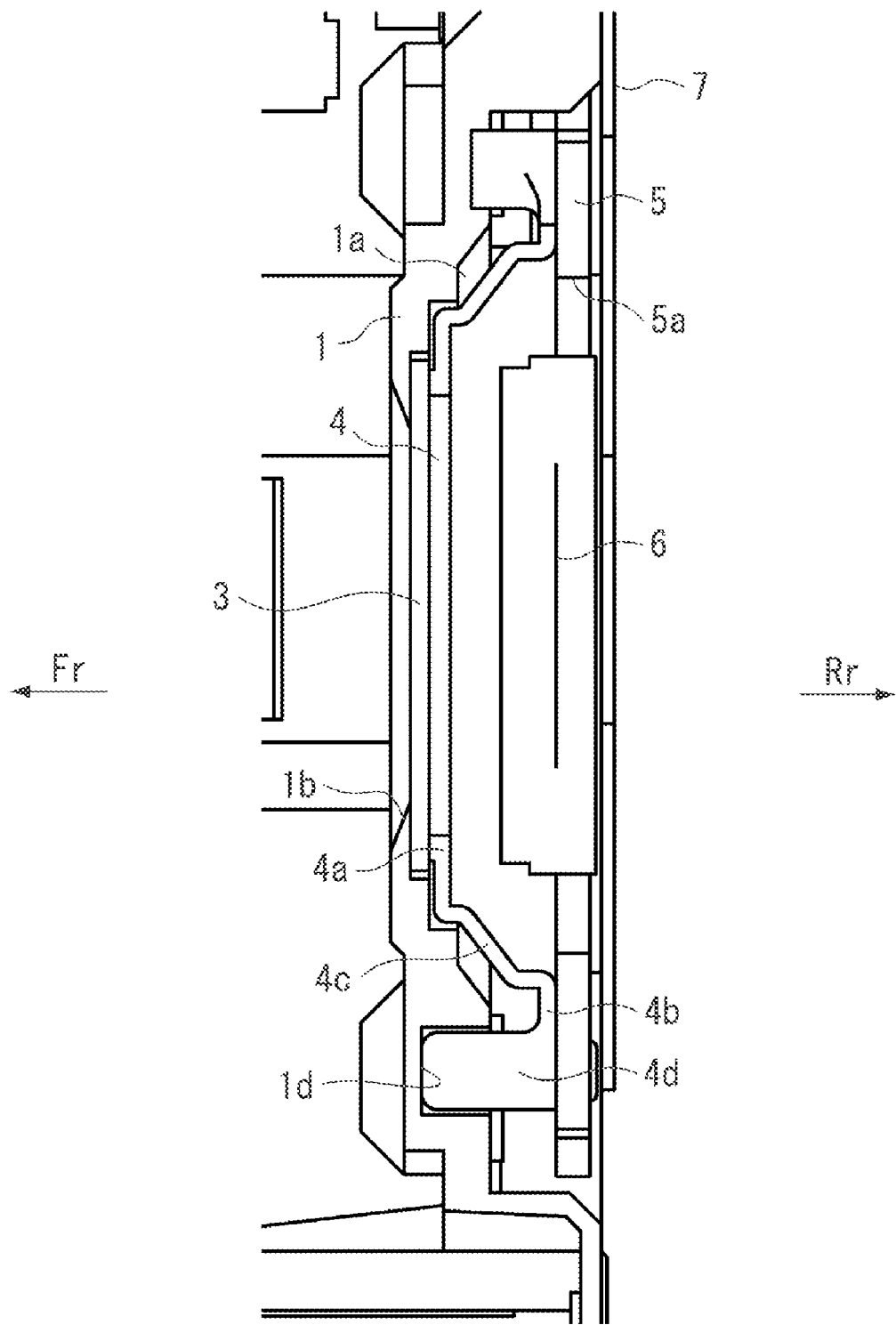
FIG. 5 is a cross-sectional view illustrating a state of the imaging sensor before optical adjustment thereof according to the exemplary embodiment.

FIG. 5 is a longitudinal cross-sectional view illustrating a state in which the adjustment screws 8 are screwed to the female screw portions 1c, and the components are assembled to the fixing ground plate 1.

As illustrated in FIG. 5, there is no space between the pressing portion 4a of the dust-proofing rubber 4 and the optical filter 3 and between the abutment portion 4b of the dust-proofing rubber 4 and the holding plate 5, and the dust-proofing portion 4c surrounds the circumference of the imaging sensor 6. The end of the urging portion 4d of the dust-proofing rubber 4 comes into contact with the bottom surface of the closed-end hole 1c of the fixing ground plate 1, and the base end of the urging portion 4d comes into contact with the holding plate 5.

Next, a method is described for performing the positional adjustment in the optical axis direction and the inclination adjustment of the imaging sensor 6 when the light reception surface of the imaging sensor 6 is displaced from the optical axis direction or is not perpendicular thereto in a state in which the components are assembled to the fixing ground plate 1.

According to the present exemplary embodiment, the screwed amounts of the adjustment screws 8 are changed, thereby enabling the positional adjustment and inclination adjustment of the imaging sensor 6.

From the state illustrated in FIG. 5, the three adjustment screws 8 are rotated in the direction for increasing the screwed amounts to the female screw portions 1c. Then, the head portion 8a of the adjustment screw 8 moves the entire holding plate 5 in the front direction (in the direction close to the photographing optical system) of the optical axis direction as illustrated in FIG. 6, via a through-hole 5d of the holding plate 5.

Figure 6:
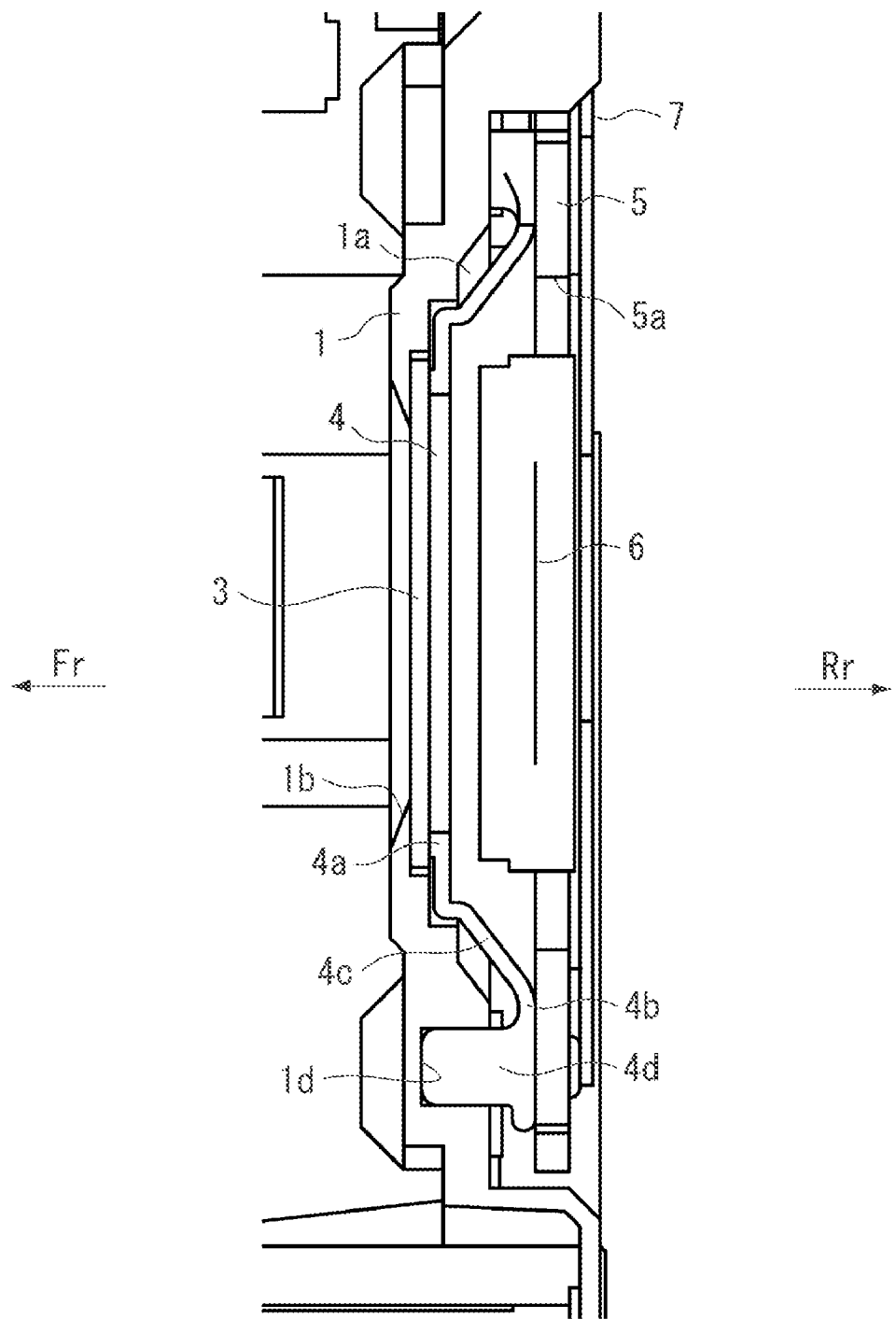
FIG. 6 is a cross-sectional view illustrating a state of the imaging sensor after the optical adjustment thereof according to the exemplary embodiment.

At this time, the urging portion 4d is pressed by the holding plate 5, and is thus deformed to decrease in the optical axis direction and to expand in the diameter direction (refer to FIG. 6). With the deformation, elastic force is generated in the urging portion 4d in the direction for urging the holding plate 5 in the rear direction. The dust-proofing portion 4c is pressed by the holding plate 5 via the abutment portion 4b, thereby being deformed in the optical axis direction while entirely bending the dust-proofing portion 4c (refer to FIG. 6).

With the deformation, elastic force is generated to urge the optical filter 3 in the front direction via the pressing portion 4a and the holding plate 5 in the rear direction via the abutment portion 4b in the dust-proofing portion 4c. Therefore, when the adjustment screws 8 are rotated in the direction for increasing the screwed amount, the adjustment screws 8 need to be screwed against the elastic force of the urging portion 4d and the dust-proofing portion 4c.

The three adjustment screws 8 are rotated in the direction for reducing the screwed amounts to the female screw portions 1c from the state illustrated in FIG. 6. Then, the head portion 8a of the adjustment screw 8 is moved in the rear direction (direction apart from the photographing optical system).

Since elastic force is being generated in the direction for urging the holding plate 5 in the rear direction in the urging portion 4d and the dust-proofing portion 4c, the elastic force urges the holding plate 5 in the direction to come into contact with the head portion 8a of the adjustment screw 8. Therefore, the entire holding plate 5 is moved in the rear direction of the optical axis direction depending on the screwed amount reduced by the three adjustment screws 8.

In the rotation to increase the amounts of screw of the three adjustment screws 8, the elastic force generated in the pressing portion 4a and the dust-proofing portion 4c is smaller than the elastic force generated in the urging portion 4d.

Therefore, even when the screwed amounts of the three adjustment screws 8 are changed to move the holding plate 5 in the optical axis direction, only with the elastic force generated in the urging portion 4d, the optical adjustment of the imaging sensor 6 is performed. Therefore, the optical filter 3 is held, and a sealing configuration is kept between the optical filter 3 and the imaging sensor 6.

The rotation with increase or reduction in the screwed amounts of the adjustment screws 8 moves the imaging sensor 6 held to the holding plate 5 in the front and rear directions of the optical axis direction, thereby enabling the positional adjustment of the imaging sensor 6.

The screwed amounts of three adjustment screws 8 are individually changed, thereby adjusting the inclination of the holding plate 5. First, with the rotation to increase the screwed amount of one adjustment screw 8, only the portion of the holding plate 5 corresponding to the rotated adjustment screw 8 is moved in the front direction of the optical axis direction, and the portion of the holding plate 5 corresponding to the two other adjustment screws 8 is not substantially changed.

Therefore, the holding plate 5 is inclined with the axial line for connecting two other adjustment screws 8 as a center, thereby enabling the inclination adjustment of the imaging sensor 6 held by the holding plate 5 in the optical axis direction.

On the other hand, with rotation to reduce the screwed amount of one of the adjustment screws 8, the urging portion 4d adjacent to the rotated adjustment screw 8 mainly urges the holding plate 5 in the direction to come into contact with the head portion 8a of the adjustment screw 8.

At this time, the positions of the holding plate 5 corresponding to two other adjustment screws 8 are not substantially changed. Therefore, with the axial line for connecting the two other adjustment screws 8 as a center, the holding plate 5 is inclined, thereby enabling the inclination adjustment of the imaging sensor 6 held by the holding plate 5 in the optical axis direction.

With the rotation to increase or reduce the screwed amount of one of the adjustment screws 8, the imaging sensor 6 held by the holding plate 5 is moved to be bent in the optical axis direction, thereby enabling the inclination adjustment of the imaging sensor 6. By similarly rotating other adjustment screws 8, the inclination of the imaging sensor 6 in the optical axis direction is freely adjusted.

With the rotation to increase the screwed amount of one of the adjustment screws 8, the urging portion 4d adjacent to the rotated adjustment screw 8 is pressed by the holding plate 5, the urging portion 4d is mainly compressed in the optical axis direction, and large elastic force is generated.

Therefore, when the adjustment screw 8 is rotated in the reverse direction, the holding plate 5 is moved mainly using the elastic force generated in the urging portion 4d, thereby improving the following performance of the movement of the holding plate 5 with respect to the rotation of the adjustment screw 8.

As described above, the urging portion 4d extended in the optical axis direction is arranged at the outer circumference fringe of the abutment portion 4b of the dust-proofing rubber 4. By using the elastic force of the urging portion 4d, in the positional adjustment in the optical axis direction and inclination adjustment of the imaging sensor 6, dedicated parts are not required and the number of parts is reduced.

Further, the urging portion 4d of the dust-proofing rubber 4 can be arranged at an arbitrary position, thereby improving the degree of freedom of arrangement of parts and easily performing the positional adjustment in the optical axis direction and the inclination adjustment of the imaging sensor 6.

According to the exemplary embodiments, the case of arranging the urging portion 4d adjacent to the adjustment screw 8, is described. However, the present invention is not limited to this, and the urging portion 4d may be arbitrarily arranged.

The case of forming the closed-end hole 1d to the fixing ground plate 1 and inserting the urging portion 4d of the dust-proofing rubber 4 to the closed-end hole 1d, is described. However, the present invention is not limited to this, and the closed-end hole 1d may not be formed. Although the urging portion 4d has cylindrical shape, the urging portion 4d may have prismatic shape.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-291276 filed Dec. 22, 2009, which is hereby incorporated by reference herein in its entirety.

What is claimed is:

1. An imaging apparatus comprising:
    an imaging sensor configured to convert a subject image passing through a photographing optical system into an electrical signal;
    a holding member configured to hold the imaging sensor; and
    a dust-proofing member configured to surround the circumference of a light reception surface of the imaging sensor, and
    wherein an urging portion is integrally formed with the dust-proofing member to urge the holding member in a direction apart from the photographing optical system.

2. The imaging apparatus according to claim 1, further comprising:
    an adjustment member configured to move the holding member in a direction close to the photographing optical system,
    wherein the urging portion is arranged adjacent to the adjustment member.

3. The imaging apparatus according to claim 1, wherein the urging portion is projected to be elastic in an optical axis direction, and an end of the urging portion abuts to a bottom surface of a closed-end hole formed in a fixing ground plate in which the holding member is accommodated.

4. The imaging apparatus according to claim 1, further comprising:
    an optical filter configured to cut off a high frequency noise component of light irradiated onto the light reception surface of the imaging sensor,
    wherein the dust-proofing member includes a pressing portion that presses the optical filter, an abutment portion that abuts the holding member, and a dust-proofing portion that connects the pressing portion and the abutment portion, and
    wherein the dust-proofing portion urges the optical filter toward the photographing optical system via the pressing portion.

5. The imaging apparatus according to claim 4, wherein the dust-proofing portion is diagonally formed from the abutment portion to the pressing portion.

6. The imaging apparatus according to claim 1, wherein urging force to urge the optical filter via the pressing portion by the dust-proofing portion is smaller than urging force to urge the holding member with the urging portion.

7. The imaging apparatus according to claim 1, wherein the urging portion includes cylindrical rubber.

* * * * *